(12) United States Patent
Elgimiabi

(10) Patent No.: US 10,106,711 B2
(45) Date of Patent: Oct. 23, 2018

(54) EPOXY ADHESIVE COMPOSITIONS COMPRISING AN ADHESION PROMOTER

(71) Applicant: 3M INNOVATIVE PROPERTIES COMPANY, St. Paul, MN (US)

(72) Inventor: Sohaib Elgimiabi, Dusseldorf (DE)

(73) Assignee: 3M Intellectual Property Company, St. Paul, MN (US)

( * ) Notice: Subject to any disclaimer, the term of this patent is extended or adjusted under 35 U.S.C. 154(b) by 0 days.

(21) Appl. No.: 15/335,813

(22) Filed: Oct. 27, 2016

(65) Prior Publication Data

US 2017/0044408 A1 Feb. 16, 2017

Related U.S. Application Data

(62) Division of application No. 14/485,254, filed on Sep. 12, 2014, which is a division of application No. 13/072,278, filed on Mar. 25, 2011, now abandoned.

(51) Int. Cl.
| | |
|---|---|
| *B32B 5/00* | (2006.01) |
| *B32B 27/00* | (2006.01) |
| *C09J 163/00* | (2006.01) |
| *C08G 59/50* | (2006.01) |
| *B32B 7/12* | (2006.01) |
| *B32B 15/04* | (2006.01) |
| *B32B 27/06* | (2006.01) |
| *B32B 37/12* | (2006.01) |
| *B32B 5/02* | (2006.01) |
| *B32B 15/18* | (2006.01) |
| *B32B 15/20* | (2006.01) |
| *C08L 75/04* | (2006.01) |
| *C08K 3/22* | (2006.01) |
| *C08K 5/521* | (2006.01) |

(52) U.S. Cl.
CPC ............. *C09J 163/00* (2013.01); *B32B 5/02* (2013.01); *B32B 7/12* (2013.01); *B32B 15/04* (2013.01); *B32B 15/18* (2013.01); *B32B 15/20* (2013.01); *B32B 27/06* (2013.01); *B32B 37/12* (2013.01); *C08G 59/50* (2013.01); *B32B 2037/1253* (2013.01); *B32B 2250/02* (2013.01); *B32B 2255/02* (2013.01); *B32B 2255/26* (2013.01); *B32B 2262/101* (2013.01); *B32B 2264/0257* (2013.01); *B32B 2311/24* (2013.01); *B32B 2311/30* (2013.01); *B32B 2315/085* (2013.01); *C08K 3/22* (2013.01); *C08K 5/521* (2013.01); *C08K 2003/2227* (2013.01); *C08L 75/04* (2013.01); *Y10T 428/254* (2015.01); *Y10T 428/31515* (2015.04); *Y10T 428/31522* (2015.04)

(58) Field of Classification Search
None
See application file for complete search history.

(56) References Cited

U.S. PATENT DOCUMENTS

| | | | |
|---|---|---|---|
| 4,223,115 A | 9/1980 | Zalucha | |
| 4,315,085 A | 2/1982 | Ozari | |
| 5,130,463 A | 7/1992 | Haubennestel | |
| 5,186,993 A | 2/1993 | Hallden-Abberton | |
| 5,972,423 A * | 10/1999 | Abbey | C08G 59/68 427/140 |
| 6,313,257 B1 | 11/2001 | Abbey | |
| 2004/0169162 A1 | 9/2004 | Xiao | |
| 2005/0137357 A1 | 6/2005 | Skoglund | |
| 2007/0293603 A1 | 12/2007 | Shepherd | |
| 2008/0188609 A1* | 8/2008 | Agarwal | C08L 51/04 524/504 |
| 2009/0186975 A1* | 7/2009 | Schaal | C08K 5/54 524/437 |
| 2009/0273070 A1 | 11/2009 | Tendou | |
| 2009/0297856 A1 | 12/2009 | Dohner | |
| 2012/0141803 A1 | 6/2012 | Campbell | |

FOREIGN PATENT DOCUMENTS

| | | |
|---|---|---|
| EP | 1 632 533 A1 | 3/2006 |
| JP | 54-160456 | 12/1979 |
| JP | 63-186786 | 8/1988 |
| JP | 3020383 | 1/2000 |
| JP | 2008-214602 | 9/2008 |
| JP | 2009-007424 | 1/2009 |
| WO | WO 1995/034593 | 12/1995 |
| WO | WO 2005/085261 A1 | 9/2005 |
| WO | WO 2010/011705 | 1/2010 |
| WO | WO 2011/005925 A1 * | 1/2011 |

OTHER PUBLICATIONS

Albana data sheet W510, "BYK Additives & Instruments", Issue Oct. 10, 2010, two pages.

* cited by examiner

*Primary Examiner* — Ana L. Woodward
(74) *Attorney, Agent, or Firm* — Philip P. Soo

(57) ABSTRACT

Curable adhesive compositions comprising
vi. a curable epoxy resin
vii. an amine curing agent,
viii. a polymeric toughening agent,
ix. a filler and
x. a phosphoric acid ester according to the formula

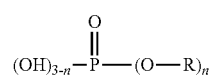

(I)

as an adhesion promoter, wherein R represents an aliphatic or aromatic residue that contains one or more carboxylic acid ester units and/or one or more urethane units and that further contains at least one ether group and n represents an integer of 1 or 2, methods of making them, bonded articles and methods for bonding.

11 Claims, No Drawings

EPOXY ADHESIVE COMPOSITIONS COMPRISING AN ADHESION PROMOTER

CROSS REFERENCE TO RELATED APPLICATION

This application is a Divisional Application of prior application Ser. No. 14/485,254, filed Sep. 12, 2014, which is a Divisional Application of application Ser. No. 13/072,278, filed Mar. 25, 2011, now abandoned, which claims benefit of GB Patent Application No. 1005444.3, filed Mar. 31, 2010, the disclosures of which are incorporated by reference in their entirety herein.

FIELD

The following disclosure relates to epoxy-based adhesive compositions comprising an adhesion promoter. The disclosure further relates to a method of bonding of epoxy-based adhesives to substrates and to bonded articles produced with the method.

BACKGROUND

Structural adhesives, in particular structural epoxy adhesives, are useful for generating bonds having a mechanical strength comparable to that achieved by mechanical fasteners. Therefore, structural adhesives can be used to augment or even replace conventional joining techniques such as welding or the use of mechanical fasteners.

Structural epoxy adhesives can be used for bonding a variety of substrates, for example, metal substrates, such as steel and aluminium, or synthetic substrates, such as fiber-reinforced composites. However, to achieve strong bonds, these substrates need to be pre-treated, for example by applying layers of primer compositions to create a good bond between epoxy adhesive and substrate.

The use of primers is economically disadvantageous. Therefore, instead of applying primer layers, adhesion promoters have been added to epoxy compositions. Adhesion promoters for epoxy-based adhesives as known in the art are based on organic silanes, such as described, for example, in Patent Application No. US2009/0297856 to Dohner et al. However, it has been found that the use of silanes as bonding promoters may not give satisfying results on certain substrates, in particular metal or plastic substrates.

Accordingly, there is a need for structural epoxy adhesive compositions that provide good adhesion to substrates, in particular substrates selected from metals such as, for example, steel or aluminium, or plastics. Desirably, such adhesive compositions achieve good bonds of high mechanical strength without requiring primers.

SUMMARY

It has now been found that epoxy-based structural adhesive formulations comprising certain phosphoric acid esters can provide high bonding strength between substrates without using a primer.

Therefore, in one aspect, there is provided a curable epoxy adhesive composition comprising
  i. a curable epoxy resin
  ii. an amine curing agent,
  iii. a polymeric toughening agent,
  iv. a filler material and
  v. a phosphoric acid ester according to the formula

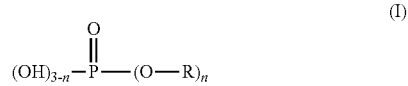

wherein R represents an aliphatic or aromatic residue that contains one or more carboxylic acid ester units and/or one or more urethane units and that further contains at least one ether group and n represents an integer of 1 or 2.

In another aspect there is provided an article comprising a first substrate, a second substrate and a composition between the first and second substrate bonding the first substrate to the second substrate, said composition comprising the reaction product of a curing reaction of the curable composition described above and wherein the first and second substrates are selected independently from each other from aluminium, steel and a resin-based composite material comprising fibers.

In yet another aspect there is provided a method for bonding a first substrate to a second substrate comprising
  (i) adding the curable epoxy adhesive composition described above to at least a part of the first substrate
  (ii) applying the second substrate to the first substrate at a position where the first substrate contains the curable epoxy adhesive composition
  (iii) subjecting the curable epoxy adhesive composition to curing,
  wherein the first and second substrate are selected independently from each other from aluminium, steel and a resin-based composite material.

In a further aspect there is provided the use of a phosphoric acid ester according to the formula

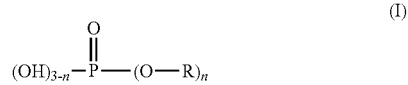

wherein R represents an aliphatic, cycloaliphatic and/or aromatic group, having at least one ether oxygen atom and at least one carboxylic acid ester and/or at least one urethane group and n is an integer of 1 or 2, as an adhesion promoting agent for bonding substrates with curable epoxy adhesive compositions wherein the substrates are selected from steel, aluminium and resin-based composite materials.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. Contrary to the use of "consisting", the use of "including," "containing", "comprising," or "having" and variations thereof is meant to encompass the items listed thereafter as well as additional items. In both cases equivalents are meant to be included.

The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

The terms 'solid' or 'liquid' refer to ambient conditions (20° C., 1 bar).

It has been found that the phosphoric acid esters described herein or their salts may act as an adhesion promoter for bonding substrates with curable epoxy compositions. By using the phosphoric acid ester as an adhesion promoter good bond strengths could be achieved by directly applying the adhesive composition to the substrate. Therefore, the use of a primer is not required to achieve good bond strength.

Good bond strength between substrates as referred to herein typically means shear strength of at least 9, preferably at least 10 MPa. Preferred bond strength include a shear strength of at least 10, or at least 15, or at least 17 MPa for steel substrates, at least 10, or at least 15, or at least 20, or at least 25 MPa for aluminium substrates. For composite materials good bond strength include a shear strength of at least 8 MPa.

Adhesive bonds between substrates may be obtained that have good adhesive strength, such as for example a peel strength of greater than 80N/25 mm, preferably greater than 100N/25 mm.

Adhesion bonds can be generated that are further characterized by cohesive failure (or substrate failure in case the substrate is a composite).

The curable compositions provided herein comprise at least one curable epoxy resin, at least one amine curing agent, one or more polymeric toughening agent, one or more filler material and at least one phosphoric acid ester or a salt thereof. The compositions their preparation and their applications will now be described in greater detail.

Substrates:

The compositions provided herein may generate strong bonds between substrates without the need of using primers. Substrates include metals and plastics. Preferred metals are aluminium and steel and including alloys thereof. Preferred plastics are phenolic resins (i.e. polymers containing repeating units derived from reacting a phenol with formaldehyde), resins comprising or consisting of polyethylene, polypropylene, polycarbonate, polyester, polyamide, polyimide, polyacrylate, or polyoxymethylene or mixtures thereof. Typically, the plastics are composite materials, containing the resin and embedded therein fibers, typically glass fibers, carbon fibers or combinations thereof. Other suitable resins are epoxy resins (i.e. resins containing repeating units derived from cross-reacting monomers or components containing epoxy groups).

Good bonds can be achieved between the same (e.g. aluminium-aluminium substrates) but also between different substrates (e.g aluminium and steel or aluminium and plastic or steel and plastic).

Phosphoric Acid Esters

Suitable phosphoric acid esters are those represented by the formula (I) and salts thereof:

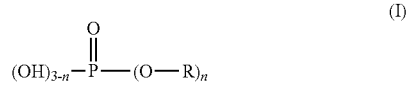
(I)

In formula (I) R represents an aliphatic or aromatic residue that contains one or more carboxylic acid ester units and/or one or more ureathane units and that further contains at least one ether group. In formula (I) n represents an integer of 1 or 2. In one embodiment, R represents an oxyalkylated, preferably ethoxylated, monoalcohol containing at least one carboxylic acid ester groups and/or at least one urethane group. Mixtures of compounds according to formula (I), wherein the groups R may be the same or different are also contemplated.

The residue R typically has a molecular weight between 200 and 1,0000, preferably between 300 and 5,000, most preferably between 400 and 2,000 g/mole.

The phosphoric acid esters typically have an acid value between 50 and 150 mg KOH/g, preferably between 75 and 130 mg KOH/g.

Phosphoric acid esters according to formula (I) and their synthesis are described for example in U.S. Pat. No. 5,130,463. They can be prepared by reacting a phosphoric acid compound with one to two equivalents of a monohydroxy compound corresponding to the formula R—OH, wherein R has the meaning described above.

Examples of phosphoric acid compounds include phosphorus oxychloride, phosphorus pentoxide, phosphoric acid, polyphosphoric acid and acetyl phosphate.

Salts of the phosphoric acid esters can be formed through their remaining acid groups, using organic or inorganic bases. Examples of suitable organic bases include primary, secondary and tertiary amines and aminoalcohols. Examples of suitable inorganic bases include $NH_3$, NaOH, KOH, LiOH, $Mg(OH)_2$ and $Ca(OH)_2$.

The monohydroxy compounds ROH contain at least one ether oxygen atom (—O—) and at least one carboxylic acid ester group (—COO—) and/or urethane group (—NHCOO—).

These compounds are hydroxyl terminated polyether-polyesters, polyether-polyurethanes or polyether-polyester-polyurethanes, and the respective groups can be arranged in blocks or randomly.

Suitable polyether-polyesters groups include those obtained by polymerizing a lactone, such as for example caprolactone, by means of a monohydroxypolyether having a molecular weight (Mn) in the range from about 100 to 5,000.

Further suitable polyether-polyesters groups include those which can be obtained by condensation of a glycol and a dibasic acid in the presence of the above-described monohydroxypolyethers.

Further suitable polyether-polyesters groups include those which are obtainable by condensation of a hydroxycarboxylic acid in the presence of monohydroxypolyethers as described above.

Suitable polyether-polyurethane groups and/or polyether-polyester-polyurethane groups include those that can be obtained by the addition of a diisocyanate to a dihydroxy compound in the presence of the monohydroxy polyethers described above.

Suitable dihydroxy compounds for forming these urethane group-containing compounds include diols, advantageously those having 2 to 12 carbon atoms, polyoxyalkylene glycols and/or dihydroxy-functional polyesters preferably having molecular weights of at most 2,000.

Useful diisocyanates include aliphatic, cycloaliphatic and/or aromatic diisocyanates having 4 to 15 carbon atoms, such as for example tetramethylene-, hexamethylene-, trimethylhexamethylene-, dodecamethylene-, isophorone-, toluene- and diphenylmethane diisocyanate, methylene-bis(-4-cyclohexyldiisocyanate), or 1,4-cyclohexane-bis-(methylisocyanate).

Phosphoric acid esters useful in the composition of the present invention are commercially available and include for example BYK-W 9010 and BYK-W 996, available from BYK Chemie, Germany.

The phosphoric acid ester is typically used in an amount between 0.1 and 1 parts by weight, preferably between 0.15 and 0.5 parts by weight based on 100 parts of the curable epoxy composition.

The phosphoric acid ester is preferably used as 100% solids material, but may also be used as a dispersion in a liquid or as solution. Suitable liquids or solvents include for example, but not limited to 2-methoxy-1-methylethyl acetate and petroleum. Preferably the phosphoric acid ester is used without solvent.

Epoxy Resins:

Curable epoxy resins are polymers having one or more epoxy-functionality. They are polymerizable or cross-linkable by a ring opening reaction of the epoxy functionality. Typically, but not exclusively, the polymers contain repeating units derived from monomers having an epoxy-functionality but epoxy resins can also include, for example, silicone-based polymers that contain epoxy groups or organic polymer particles coated with or modified with epoxy groups or particles coated with, dispersed in, or modified with epoxy-groups-containing polymers. The epoxy resins may have an average epoxy-functionality of at least 1, greater than one, or of at least 2.

The curable epoxy resins may be aromatic, aliphatic, cycloaliphatic or mixtures thereof. Preferably, the epoxy resins contain moieties of the glycidyl or polyglycidyl ether type. Such moieties may be obtained, for example, by the reaction of a hydroxyl functionality (for example but not limited to dihydric or polyhydric phenols or aliphatic alcohols including polyols) with an epichlorohydrin-functionality. As referred to herein, dihydric phenols are phenols containing at least two hydroxy groups bonded to the aromatic ring (also referred to as "aromatic" hydroxy groups) of a phenol or in case of polyphenols at least two hydroxy groups are bonded to an aromatic ring. This means the hydroxyl groups can be bonded to the same ring of the polyphenol or to different rings each of the polyphenol. Therefore, the term "dihydric phenols" is not limited to phenols or polyphenols containing two "aromatic" hydroxy groups but also encompasses polyhydric phenols, i.e. compounds having more than two "aromatic" hydroxy groups. Examples of useful dihydric phenols include resorcinol, catechol, hydroquinone, and polyphenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphrhylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxy-diphenylmethylpropylmethane, dihydroxydiphenylethylphenylmethane, dihydroxydiphenylpropylenphenylmethane, dihydroxydiphenylbutylphenylmethane, dihydroxydiphenyl-tolylethane, dihydroxydiphenyltolylmethylmethane, dihydroxydiphenyldicyclohexyl-methane, and dihydroxydiphenylcyclohexane.

Preferred epoxy resins include epoxy resins containing or consisting of glycidyl ethers or polyglycidyl ethers of dihydric or polyhydric phenols, such as for example, but not limited to bisphenol A, bisphenol F and combinations thereof. Instead of, or in addition to, using the aromatic epoxy resins described above also their fully or partially hydrogenated derivatives (i.e. the corresponding cycloaliphatic compounds) may be used.

Preferably the epoxy resin is liquid at room temperature but also solid epoxy resins, or resin particles may be used or may be used in dissolved form, for example dissolved or dispersed in another liquid resin.

Examples of commercially available epoxy resins include diglycidylether of bisphenol A (e.g. available under the trade designation EPON 828, EPON 830 or EPON 1001 from Hexion Speciality Chemicals GmbH, Rosbach, Germany, or under the trade designation D.E.R-331 or D.E.R-332 from Dow Chemical Co,); diglycidyl ether of bisphenol F (e.g. EPICLON 830 available from Dainippon Ink and Chemicals, Inc. or D.E.R.-354 from Dow Chemical Co, Schwalbach/Ts., Germany); silicone resins containing diglycidyl epoxy functionalities; flame retardant epoxy resins (e.g. DER 580, a brominated bisphenol type epoxy resin available from Dow Chemical Co.); Other epoxy resins based on bisphenols are commercially available under the trade designations EPIKOTE (Hexion Speciality Chemicals, Rosbach, Germany), D.E.N. (Dow Chemical Co, Schwalbach/Ts., Germany), or EPILOX (Leuna Epilox GmbH, Leuna, Germany).

Toughening Agents:

Toughening agents are polymers, other than the epoxy resins described above, that are capable of increasing the toughness of cured epoxy resins. The toughness can be measured, for example, by the floating roller peel tests of the cured compositions according to DIN 2243-2, as described in the example section provided herein. Typical toughening agents include core/shell polymers and liquid rubbers.

Particularly suitable toughening agents include core/shell polymers. Core-shell polymers have a structure containing an internal part, referred to as core and an exterior part referred to as shell. The core of the core-shell polymer is typically elastomeric. It typically has a low glass transition temperature (Tg) (e.g. a Tg of less than about −30° C., or preferably less than about −50° C.). Core and shell may be made of the same or of different polymers.

The core of the core-shell polymer may comprise or consist of a polymer or copolymer of a diene, which means the core may comprise a homo- or copolymer comprising repeating units derived from an olefin having two unsaturations. Examples of such olefins include but are not limited to, butadiene and isobutadiene. The core of the core-shell polymer may also comprise a homopolymer or copolymer comprising repeating units derived from a lower alkyl acrylate (e.g. an alkyl acrylate containing up to 20 carbon atoms). Examples of such alkyl acrylates include but are not limited to, n-butyl-, ethyl-, isobutyl- or 2-ethylhexylacrylate. The core of the core-shell polymers may also comprise silicone resins or copolymers thereof. The core of the core-shell polymers may also comprise copolymers of one or more of the afore-mentioned monomers with styrene or a styrene-derivative. Examples of such copolymers include, but are not limited to butadiene-styrene copolymers.

The shell of the core-shell polymer may contain the polymer of the core and one or more further copolymers. Typical copolymers include polymers containing repeating units derivable from unsaturated olefins (for example but not limited to monounsaturated olefins such as for example ethylenes, styrenes and the like), olefinic esters (for example but not limited to vinyl acetates), olefinic acids (for example but not limited to acrylates, methacrylates) or olefinic halogens (for example but not limited to vinyl chloride).

The shell may also not contain the polymer of the core but contains a polymer or copolymer comprising repeating units derivable from unsaturated olefins (for example but not limited to monounsaturated olefins such as for example ethylenes, styrenes and the like), olefinic esters (for example but not limited to vinyl acetates), olefinic acids (for example but not limited to acrylates, methacrylates) or olefinic halogens (for example but not limited to vinyl chloride). The core-shell polymer may or may not have reactive groups which can react with the epoxy resins or curing agents. The reactive groups may include, for example, epoxy groups, such as glycidyl ether groups, which may be introduced into the shell by using glycidyl methacrylate as monomer. In an embodiment of the invention, the core-shell polymer does not contain reactive groups that can react with the epoxy-resin or the curing agents comprised in the formulation, such as epoxy groups and/or amine groups.

Core-shell polymers can be prepared for example by polymerizing monomers until a certain particle size has been generated. The polymerization is then altered for example by changing the monomer feed such that a shell is polymerized around the particles.

Alternatively, the shell can be grafted onto the core or introduced by cross-linking reactions. Examples of methods for making core-shell polymers can be found, for instance, in U.S. Pat. No. 5,186,993 to Hallden-Alberton and Wills and U.S. Pat. No. 4,315,085 to Ozari and Barabas, or European Patent application No 1,632,533 to Katsumi and Masakuni, which are all incorporated herein by reference.

The core-shell polymers may be solid. They may be particulate materials. The core-shell polymers may have an average particle size (number average) of from about 20 nm to about 4,000 nm or from about 50 nm to about 500 nm. The particle sizes may be determined by electronic microscopy.

The core shell polymers may have several glass transition temperatures (core and shell material may be chemically different). The compositions provided herein preferably contain at least one core-shell polymer having at least one glass transition temperature (Tg) of less than about −30° C., or less than about −50° C. and even more preferably the core-shell polymer has at least one Tg of less than about −50° C. or even less than about −70° C.

The core shell polymer may be used in the curable composition in an amount of from about 10 to 50% by weight of the total composition, preferably from 10 to 30%.

Core shell polymers are commercially available, for example under the trade designation GENIOPERL (silicone-based core-shell polymers from Wacker Chemie, Munich, Germany), ALBIDUR (silicone-based core-shell polymers from Nanoresins, Geesthacht, Germany, PARALOID EXL (methacrylate-butadiene-styrene core-shell polymers from Rohm and Haas, Philadelphia, Pa., USA), or KANE ACE MX (from Kaneka, Brussels, Belgium). Most of the commercially available core-shell polymers are dispersed in some quantity of epoxy resins, the epoxy equivalent weights are indicated by the suppliers. This introduced amount of epoxy resin has to be considered when making up the composition and when adjusting the epoxy: hardener (curing agent) ratio.

In addition to or instead of core-shell polymers, the compositions may contain other toughening agents. Such toughening agents include liquid rubbers. Typical examples include homo- or copolylmers containing repeating units derived from butadiene or isobutadiene. The liquid rubbers may include, for example, copolymers of butadiene or isobutadiene with acrylates and/or acyrlonitriles. A particular example includes liquid butadiene acrylonitrile rubbers (ATBN). Such liquid rubbers may or may not contain reactive end groups, such as for example amine-terminated rubber (ATBN) or carboxylate-terminated rubber (CTBN) or liquid rubbers containing free epoxy- or methacrylate endgroups. Rubber means the polymers are elastomeric. The addition of a liquid butadiene rubber is believed to improve the mechanical strength of the cured adhesives at elevated temperatures, in particular at temperatures of 90° C., 120° C. or even 135° C. Liquid butadiene rubbers are commercially available, for example under the trade designation HYCAR from Lubrizol Advanced Materials, or HYPRO from Nanoresins AG, Geesthacht, Germany.

Amine Curing Agents:

The curable compositions provided herein comprise one of more amine curing agents.

Curing agents as referred to herein are compounds which are capable of cross-linking the epoxy resin. Typically, these agents are primary or secondary amines, with primary amines being preferred. The amines may be aliphatic, cycloaliphatic or aromatic structures having one or more amino moiety.

Examples for the curing agent useful in the invention include those amines having the general formula (II)

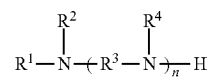

wherein the residues $R^1$, $R^2$, and $R^4$, independently from each other, may represent hydrogen or a hydrocarbon (such as an alkyl) or an alkoxy or a polyoxyalkyl residue containing about 1 to 15 carbon atoms. $R^3$ represents a hydrocarbon, an alkylether or a polyether alkyl residue, preferably containing about 1 to 15 carbon atoms. More preferably $R^3$ is a polyetheralkyl residue. Preferably, the residues $R^1$, $R^2$, and $R^4$ are chosen such that the amine contains at least one or two primary amine groups;

n represents 1, 2, 3, 4, 5, 6, 7, 8, 9 or an integer from 1 to 10.

Examples of suitable curing agents wherein $R^3$ is an alkyl include ethylene diamine, diethylene diamine, triethylene tetraamine, propylene diamine, tetraethylene pentaamine, hexaethylene heptaamine, hexamethylene diamine, 2-methyl-1,5-pentamethylene-diamine, and the like.

The curing agent may be a polyether amine having one or two or more primary amine moieties. The polyether amine may have 1, 2, 3, 4, 5 or 6 or from 1 to 12, or from 1 to 6 catenary ether (oxygen) atoms. Suitable polyether amines include those that can be derived from polypropylene oxide or polyethylene oxide. Suitable polyether amines are commercially available under the trade designation JEFFAMINE from Huntsman Chemicals, or TTD (4,7,10-trioxatridecane-1,13-diamine) commercially available, for example, from BASF, Ludwigshafen Germany.

A preferred class of curing agents include polyamido amines. Polyamido amines are commercially available under the trade designation ANCAMIDE from Air Products and Chemicals.

The compositions may contain from about 3 to 30% wt, preferably from 7 to 15% wt, based on the total weight of the composition of curing agents.

The molar ratio of epoxide moieties to amine curing agent can be adjusted to achieve optimum performance through routine experimentation. For example, the ratio may be from about 5:1 to about 1:5, or from about 1:1 to about 1:3.

Fillers:

The compositions may further comprise one or more fillers. Preferably, the compositions contain a filler material capable of reducing the density of the composition. "Capable of reducing the density" of the composition as used herein means that a composition comprising the filler has a lower density than the composition without the filler. Typically, the compositions may comprise 15 to 60 weight percent of such a filler material. Fillers capable of reducing the density of the curable composition includes low density inorganic fillers, (i.e., inorganic fillers having a density of between 0.1 to 0.5 g/cm$^3$) and low density organic fillers (i.e., organic fillers having a density of between 0.01 to 0.30 g/cm$^3$). Low density inorganic fillers are preferred. A combination of organic and inorganic fillers may be used but the inorganic low density fillers are preferably used in excess over the organic fillers.

The low-density inorganic fillers are preferably selected from inorganic particles, inorganic microspheres and in particular hollow inorganic particles or microspheres. The particles, and in particular the microspheres, may be selected from a variety of materials including by way of example materials comprising glass, silica, ceramic (including sol-gel derived), zirconia or combinations thereof The fillers are preferably selected so that they allow for an advantageous density of the cured composition without sacrificing its compressive strength. The fillers preferably exhibit a density of less than 0.5 g/cm$^3$, more preferably of between 0.12 and 0.42 g/cm$^3$. The fillers may have an average particle size typically have a mesh size corresponding to particle sizes of less than 500 µm, or between 10 and 100 µm.

Preferred hollow inorganic microspheres include glass microspheres which are commercially available, for example, from 3M Company under the trade designation Glass bubbles D32 or Scotchlite D32/4500.

The concentration and the nature of the fillers used in the curable compositions is preferably selected such that the density of the cured composition is less than 1 g/cm$^3$, more preferably less than 0.9 g/cm$^3$ and most preferably between 0.5 and 0.8 g/cm$^3$.

In some embodiments the adhesive compositions have a low density. Preferably the curable compositions have a density of from 0.5 to less than 1.0 g/cm$^3$. Preferably, also the compositions obtained after curing have a density of from about 0.5 to less than about 1.0 g/cm$^3$.

Other Ingredients

The compositions may further comprise adjuvants such reactive diluents, thixotropic agents, pigments, flame retardants, antioxidants, secondary curatives, catalysts and the like.

Reactive diluents and thixotropic agents may be added to control the flow characteristics of the adhesive composition.

Thixotropic Agents:

Thixotropic agents can be added to the compositions to prevent the composition from having a water-like consistency or viscosity. Thixotropic agents typically are particulate materials having particle sizes of less than 50 nm. Preferred thixotropic agents include fumed silica. Thixotropic agents are commercially available under the trade designation Cab-O-Sil from Cabot, Schwalbach im Taunus, Germany, or Aerosil from Degussa Evonik GmbH, Frankfurt, Germany. Typically, they may be present in an amount of up to 5% wt or up to 10% by weight based on the total curable composition.

Reactive Diluents:

Reactive diluents are monomeric epoxy-containing molecules. Preferably, they have a saturated or unsaturated cyclic backbone. Preferred reactive terminal ether portions include glycidyl ether. Examples of suitable diluents include the diglycidyl ether of resorcinol, diglycidyl ether of cyclohexane dimethanol, diglycidyl ether of neopentyl glycol, triglycidyl ether of trimethylolpropane. Commercially available reactive diluents are for example "Reactive Diluent 107" from Hexion or "Epodil 757" from Air Products and Chemical Inc, Allentown, Pa., USA. Reactive diluents may be added in amounts up to 15% by weight based on the total curable composition.

Secondary Curatives:

In some embodiments, the composition may also comprise a secondary curative. Secondary curatives according to the invention include imidazoles, imidazole-salts, imidazolines or aromatic tertiary amines including those having the structure of formula (III):

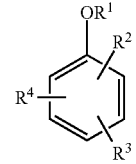

wherein
- $R^1$ is H or alkyl, such as, e.g., methyl or ethyl, preferably methyl;
- $R^2$ is CHNR$^5$R$^6$;
- $R^3$ and $R^4$ may be, independently from each other, present or absent and when present $R^3$ and $R^4$ are CHNR$^5$R$^6$;
- $R^5$ and $R^6$ are, independent from each other, alkyl, preferably CH$_3$ or CH$_2$CH$_3$.

An example for a secondary curative is tris-2,4,6-(dimethylaminomethyl)phenol commercially available as ANCAMINE K54 from Air Products Chemicals Europe B.V.

Fire Retardant Systems:

The compositions provided herein may further comprise a fire-retardant system that includes a mixture of: (1) at least one compound selected from the group comprising alkaline earth metal hydroxides and aluminium group hydroxides, and (2) at least one phosphorous-containing material. Typically, the compositions comprise the fire-retardant system of (1) and (2) above from 2 to 50 weight percent and preferably from 10 to 50 weight percent based on the total composition.

The compounds of group (1) comprising alkaline earth metal hydroxides and aluminium group hydroxides are often referred to as smoke suppressants. Especially preferred compounds include aluminium trihydrate (=aluminium oxide trihydrate, sometimes also referred to as aluminium hydroxide) and magnesium hydroxide. Commercially available aluminium trihydrate includes SPACE RITE, available from Almatis.

The phosphorous-containing material (2) may be selected from a group comprising, for example, encapsulated elemental red phosphorous, melamine phosphate, dimelamine phosphate, melamine pyrophosphate and inorganic phosphinates such as, for example, aluminium phosphinates. Elemental red phosphorous and inorganic phosphinates are preferred. Commercially available encapsulated red phosphorous includes Exolit RP 6500, available from Clariant, Germany.

The fire-retardant system may also include an optional boron-containing material, such as those selected from the group consisting of barium metaborates, calcium metaborates, zinc metaborates and mixtures thereof. These materials may provide up to 25 weight percent with respect to the mass of the curable composition.

Catalysts:

The composition may optionally contain metal salt catalysts for accelerating the curing reaction. Suitable catalysts which are operable in the present compositions include the group I metal, group II metal or lanthanoid salts wherein the anion is selected from nitrates, iodides, thiocyanates, triflates, alkoxides, perchlorates and sulfonates with the nitrates, iodides, thiocyanates, triflates and sulfonates including their hydrates being preferred. The preferred group I metal (cation) is lithium and the preferred group II metals are calcium and magnesium with calcium being especially preferred. Accordingly, preferred catalyst salts are lanthane nitrate, lanthane triflate, lithium iodide, lithium nitrate, calcium nitrate and their corresponding hydrates. In general, a catalytic amount of salt is employed. For most applications, the catalyst will be used from about 0.05 to less than 3.0 parts by weight based on the total weight of the composition. Typically, a weight ratio of metal salt catalyst to secondary curing agent of from about 1:1 to about 3:1 may be employed.

Pigments:

Pigments may include inorganic or organic pigments including ferric oxide, brick dust, carbon black, titanium oxide and the like.

Adhesive Properties:

The curable compositions contain the above-mentioned ingredients in such amounts that upon curing the desired mechanical strength will be achieved. By using the above-mentioned ingredients cured adhesives having one or more or all of the following properties can be prepared:

a) cured adhesives having a floating roller peel strength on aluminium substrates of at least 80 N/25 mm at 23° C. (as measured according to the floating roller peel strength described in the method section below);

b) cured adhesives having an overlap shear strength on steel substrates of at least 10 MPa at 23° C. (as measured according to the overlap shear strength test described in the method section below);

c) cured adhesives having an overlap shear strength on etched aluminium substrates of at least 10 MPa at 23° C. (as measured according to the overlap shear strength test described in the method section below);

d) cured adhesives having an overlap shear strength on glass fiber phenolic composite substrates of at least 5 MPa at 23° C. (as measured according to the overlap shear strength test described in the method section below).

The compositions are preferably curable at room temperature.

The adhesives can be cured at room temperature for 7 days. Curing can be accelerated by applying heat, for example, by heating at 75° C. for 30 minutes.

Adhesive Compositions:

The adhesive compositions preferably do not contain organic or aqueous solvents. Solvents as referred to herein are liquids that do not react with the ingredients of the compositions and can be removed from the composition. Typically, solvents are liquids having a boiling point at ambient conditions of less than 150° C., preferably less than 130° C. The adhesive composition is preferably a solvent-free composition, such as a 100% solids composition.

The adhesive compositions are curable at room temperature and/or heat curable. The adhesive compositions provided herein may be a one-part or a two-part composition, with two-part compositions being preferred to prevent premature curing. In case of two-part compositions, the reactive parts are kept separated from each other and the adhesive is prepared by mixing the two parts together. The mixing is preferably carried out prior to immediate use. It is possible to first mix the components together and to allow for curing at room temperature, optionally followed by a heat curing. Two-part compositions typically comprise a part A and separate therefrom a part B. Further separate parts containing further ingredients of the adhesive compositions are also contemplated. Typically, the two part compositions contain in the part (B) from about 10 to about 50% by weight (wt.) of epoxy resins, from about 0.25 to about 1% phosphoric acid ester, from about 10 to about 40% wt. toughening agent, from about 1 to about 20% wt. fillers wherein the total amount of ingredients in part (B) gives 100%.

Typically, the part (A) contains from 40 to 90% wt. curing agents and from 1 to 10% wt. fillers with the total amounts of ingredients giving 100%.

The compositions may further contain liquid rubbers, preferably liquid butadiene rubbers in amounts of 5 to 40% wt. in either part (B) or part (A) or in both. If the liquid butadiene rubber is reactive, meaning it has end groups that can participate in the curing reaction, such as for example amine-terminated butadiene rubbers, they are preferably present in the (A) part of the composition together with the curing agents.

The compositions may further contain one or more other ingredients in minor amounts, typically up to 20% wt. or up to 10% wt. in part (A) or up to about 15% wt. or up to about 10% wt. in part (B) of ingredients other than the types of ingredients described above.

For preparing the curable adhesive compositions from two part compositions parts (A) and (B) are combined. The ratio of part (A) to part (B) to be used for making the adhesive is preferably determined by their equivalent weights based on epoxy-group content and amine content respectively. Parts (A) and (B) are mixed in an equivalent weight ratio (of amine content to epoxy content) of about 1:1.

The compositions may further contain other ingredients to optimize the composition or to adapt them to specific applications. The optimum amounts of these ingredients can be identified by routine experimentation.

The adhesive composition can be applied to the desired substrate by any convenient technique. It can be applied cold or be applied warm if desired. It can be applied by extruding it or it can be applied using mechanical application methods such as a caulking gun, or by pasting it onto the substrate. Generally, the adhesive is applied to one or both substrates. The substrates are contacted such that the adhesive is located between the substrates to be bonded together. After application, the curable composition is cured by keeping the adhesive composition (in case of a two component composition obtained after mixing the components) at room temperature for an appropriate length of time, optionally followed by curing at elevated temperature. Complete curing is achieved when the cohesive strength and/or adhesive strength does no longer increase. Typically full cure is obtained after about 7 days room temperature conditions. In an alternative embodiment, curing can be done at elevated temperature in the range of, from about 60 to about 80° C. Typically the heating is carried out, depending on the curing temperature, for at least 15 minutes, at least 30 minutes, at least 2 hours, at least 8 hours or at least 12 hours.

The adhesive compositions may be used to supplement or completely eliminate a weld or mechanical fastener by applying the adhesive composition between two parts to be joined and curing the adhesive to form a bonded joint.

In areas of adhesive bonding, the adhesive can be applied as liquid, paste, and semi-solid or solid that can be liquefied upon heating, or the adhesive may be applied as a spray. It can be applied as a continuous bead, in intermediate dots, stripes, diagonals or any other geometrical form that will conform to forming a useful bond. Preferably, the adhesive composition is in a liquid or paste form. The adhesive placement options may be augmented by welding or mechanical fastening.

The adhesive compositions do not require a pre-treatment or the use of a primer and therefore, provide environmental and economical advantage.

The curable compositions provided herein may be used in vehicle assembly, such as the assembly of watercraft vehicles, aircraft vehicles or motorcraft vehicles, such as cars, motor bikes or bicycles. In particular the curable compositions may be used as adhesive for the assembly of interior components of vehicles, such as chairs, tables and the like. The compositions may also be used in body frame construction. The compositions may also be used as structural adhesives in architecture or as structural adhesive in household and industrial appliances. A preferred use of the composition is in the assembly of kitchen components, in particular aluminium components of kitchens, such as for example on-board kitchens, for vehicles like aircraft, train and watercraft.

An especially preferred structural adhesive provided herein exhibits (when cured) mainly cohesive failure on metal substrates or substrate failure on composites when evaluated in peel or shear testing methods as described below. With "cohesive failure" is meant that the adhesive splits and portions of the adhesive remain adhered to each of the bonded surfaces. A bond that fails cohesively is referred to as being "robust". With "substrate failure" is meant that the adhesive is stronger than the substrate, causing the substrate to split. A failure mode wherein an adhesive is removed cleanly from the substrate is referred to as "adhesive failure mode".

The following examples and data further exemplify the invention but are not meant to limit the invention in any form.

Materials Used:

ANCAMIDE 910 (Air Products and Chemicals, Inc., Allentown/PA/USA): polyamido amine curing agent ANCAMINE K54 (Air Products and Chemicals, Inc., Allentown/PA/USA): Tris-2,4,6-dimethylaminomethyl-phenol AEROSIL 202 (Evonik Industries, Frankfurt, Germany): hydrophobic fumed silica.

BYK-W 996 (BYK-Chemie GmbH, Germany): 50% solids solution of phosphoric acid ester, having an acid value of 71 mg KOH/g in a 50/50 blend of 2-methoxy-1-methyl ethyl acetate and petroleum BYK-W 9010 (BYK-Chemie GmbH, Germany): 100% solids phosphoric acid ester having an acid value of 129 mg KOH/g $Ca(NO_3)_2 \times 4H_2O$ (VWR International GmbH, Darmstadt, Germany): Calciumnitrate-tetrahydrate EPODIL 757 (Air Products and Chemicals Inc., Allentown, Pa./USA):
1,4-Cyclohexandimethanoldiglycidylether.

EPON 828 (Hexion Speciality Chemicals GmbH, Rosbach, Germany): epoxy resin based on diglycidylether of bisphenol-A, MW<700 g/mol.

Exolit RP 6500 (Clariant, Germany): encapsulated red phosphorous

Glass beads (90-150 μm) (3M Company, USA):

Hycar 1300X16 (Lubrizol Advanced Materials Inc, Brussels, Belgium): amine-terminated butadiene-acrylonitrile rubber (ATBN).

Kane Ace® MX 153 (Kaneka, Belgium): 33% core shell rubber in unmodified liquid epoxy resin based on Bisphenol-A.

Scotchlite $K_2O$ (3M, Germany): glass bubbles having a density of 0.2 g/cc and an isostatic crush strength of 500 psi.

SpaceRite S-11 (Almatis, Germany): white aluminium trihydroxide.

TTD (BASF, Ludwigshafen, Germany): 4,7,10-Trioxa-1,13-tridecane-diamine.

ZB-467 (Chemtura, Switzerland): Zinc Borate flame retardant/smoke suppressant

Z-6040 silane (Dow Corning, Germany): epoxy silane

Test Methods:

Particle Sizes:

Particle sizes may be determined by electron microscopy and average particle sizes are expressed as number averages.

Cohesive Strength (Overlap Shear Strength):

Overlap shear strength was determined according to DIN EN 2243-1 (2005) using a tensile tester at a crosshead speed of 10 mm/min. A Zwick/Roell Z050 tensile-tester with thermal chamber (Zwick GmbH & Co. KG, Ulm, Germany) was used. The test results were reported in MPa.

For the measurements the adhesive was applied on one end of a test strip using a spatula followed by overlapping the ends of the treated strip with the end of the non-treated strip. The two ends were pressed against each other forming an overlap of 10 mm.

Excess adhesive was then removed using a spatula. The overlapped strips were clamped at the adhesive ends using capacity binder clips. The clamped assembly was cured at room temperature at ambient humidity for 7 days prior to submitting it to the overlap shear test.

The cohesive strength was measured on 100×25×1.6 mm test strips of aluminium 2024 T3 clad (available from Rocholl GmbH, Aglasterhausen, Germany), etched by chromic-sulfuric acid (etching for 15 min. at 70° C., bath composition: 27.5 w/w $H_2SO_4$ (density 1.82), 7.5 w/w $Na_2Cr_2O_7 \cdot 2H_2O$, 65.0 w/w desalinated $H_2O$, additives: 0.5 g/l aluminum, 1.5 g/l $CuSO_4 \cdot 5H_2O$), phosphated steel (obtained from Thyssen Krupp AG, Langenfeld, Germany) and a glass fiber-epoxy resin composite (Glimberger Kunststofftechnik, Voesendorf, Austria).

Adhesive Strength (Floating Roller Peel Strength):

Adhesive strength was measured by the floating roller peel test according to DIN 2243-2 (2005) using a Zwick/Roell Z050 tensile-tester with thermal chamber (Zwick GmbH & Co. KG, Ulm, Germany) operating at a crosshead speed of 140 mm/min. The test results are reported in N/25 mm.

250×25×1.6 mm and 300×25×0.5 mm strips of aluminium 2024 T3 clad (available from Rocholl GmbH, Aglasterhausen, Germany) were cleaned by immersion in methylethylketone followed by FPL etching as described above. The strips were masked with a Teflon tape (PTFE Tape 3M 5490) leaving a blank area of 200 mm×25 mm in order to avoid flow of the adhesive over the extended area during assembly of the strips. This guarantees a defined bondline resulting in a well defined crack during the measurement. The curable adhesive composition was applied on the blank area of the 1.6 mm strip and on the blank area of the corresponding 0.5 mm strip using a spatula. The strips were pressed against each other and residual adhesive was removed with a spatula. The assembly was clamped on both sides using capacity binder clips over the length of the bondline. The adhesive was allowed to cure at room temperature at ambient humidity and during 7 days prior to testing.

Preparation of Two Part Adhesive Compositions

Preparation of Part A:

The amine curatives used were heated to 80° C. Ancamine K54 was added and the mixture was stirred for further 5 minutes. The remaining ingredients (compare table below) were added at room temperature (23° C.) while stirring for 1 minute using a high speed mixer (DAC 150 FVZ Speed mixer, Hauschild Engineering, Germany) at 3000 rpm. The ingredients were added in small amounts to make sure that all raw materials were homogeneously dispersed.

Preparation of Part B:

Epoxy resin and the toughening agents were mixed at 23° C. with stirring for 30 minutes. Then the mixture was heated to 80° C. and held for 90 minutes. The mixture was cooled down to room temperature. The remaining ingredients (compare table below) were subsequently added and homogenized with a high speed mixer (a DAC 150 FVZ Speed-mixer, Hauschild Engineering) stirring at 3000 rpm for 1 minute after each addition at 23° C.).

Mixing of Part A and Part B:

Part A and Part B were filled into a (2/1) 400 ml cartridge from MixPac. A dynamic mix nozzle was fitted to the cartridge. By using a pneumatic gun, both parts were extruded by applying 4 bar pressure. The compositions were then cured at 23° C. for 7 days.

EXAMPLES

Examples 1 and 2 and Comparative Example C-1

In examples 1 and 2 and comparative example C-1 curable compositions were prepared by mixing Part A of table 1 with different B parts of table 2. The B part of examples 1 and 2 comprised phosphoric acid ester. The B-part of comparative example C-1 did not contain phosphoric acid ester, but epoxy silane, known in the art as an adhesion promoter for epoxy compounds. In all cases, the A and B parts were combined such that the equivalent weight ratio of A:B was 1:1. The adhesive compositions were tested for cohesive and adhesive strength. The test results are recorded in table 3.

TABLE 1

| composition of A-part | |
|---|---|
| Ingredients | Weight % |
| Hycar 1300 × 16 | 11.28 |
| TTD | 7.18 |
| Ancamid 910 | 41.03 |
| Ca(NO3)2* 4H2O | 1.03 |
| Ancamine K 54 | 9.23 |
| Aluminum hydroxide | 25.64 |
| Zinc Borates | 3.08 |
| Aerosil R202 | 0.51 |
| Scotchlite K 20 | 1.03 |
| Total | 100.00 |

TABLE 2

| Composition of the B-part | | | |
|---|---|---|---|
| Ingredients (in % by weight) | B1 | B2 | C1-B |
| Kane MX 153 | 25.50 | 25.50 | 25.50 |
| Epon 828 | 15.00 | 15.00 | 15.00 |
| Exolit RP 6500 | 10.00 | 10.00 | 10.00 |
| Epodil 757 | 15.00 | 15.00 | 15.00 |
| Aluminum hydroxide | 28.20 | 28.20 | 28.20 |
| Zinc Borates | 5.00 | 5.00 | 5.00 |
| Glass beads (90-150 μm) | 1.00 | 1.00 | 1.00 |
| BYK-W 996 | 0.00 | 0.30 | 0.00 |
| BYK-W 9010 | 0.30 | 0.00 | 0.00 |
| Epoxy silane | 0.00 | 0.00 | 0.30 |
| Total | 100.00 | 100.00 | 100.00 |

TABLE 3

| Properties of cured adhesive | | | | |
|---|---|---|---|---|
| Substrate | Test (1) | Example 1 (A + B1) | Example 2 (A + B2) | C-1 (A + C1-B) |
| Phosphated steel | Shear strength | 19 MPa | Not tested | 11 MPa |
| | Failure mode | Cohesive | | adhesive |
| Etched aluminium | Shear strength | 27 MPa | 22 MPa | 14 MPa |
| | Failure mode | Cohesive | Cohesive | Adhesive |
| | Peel strength | 140 N | 122 N | 50 N |
| | Failure mode | Cohesive | Cohesive | Adhesive |
| Glass fiber phenolic composite | Shear strength | 10 MPa | 8 MPa | 6 MPa |
| | Failure mode | Substrate | Substrate | Adhesive |

The invention claimed is:

1. A method for bonding a first substrate to a second substrate comprising
   (i) applying to at least a part of the first substrate a curable epoxy adhesive composition comprising
      vi. a curable epoxy resin
      vii. an amine curing agent,
      viii a polymeric toughening agent,
      ix. a filler material and
      x. a phosphoric acid ester according to the formula

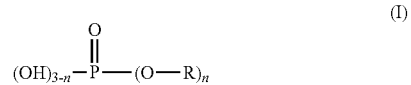

wherein R represents an aliphatic or aromatic residue containing at least one ether group,
   wherein R further contains one or more carboxylic acid ester units and/or one or more urethane units, and
   wherein n represents an integer of 1 or 2;
   (ii) applying the second substrate to the part of the first substrate where the curable composition is applied,
   (iv) subjecting the curable epoxy adhesive composition to curing, wherein the first and second substrate are selected independently from each other from aluminium, steel and a resin-based composite material.

2. The method according to claim 1 wherein the curing is carried out at room temperature.

3. The method according to claim 1 wherein the group R of the phosphoric acid ester has a molecular weight between 200 and 10,000.

4. The method according to claim 1 wherein the curable epoxy resin comprises one or more aromatic glycidyl ether units.

5. The method according to claim 1 wherein the curable epoxy resin has a molecular weight of from 150 to 4,000 g/mole.

6. The method according to claim 1 wherein the curable epoxy resin has a functionality of from 1 to 3.8.

7. The method according to claim 1 wherein the curable epoxy adhesive composition further comprises glass particles.

8. The method according to claim 1 wherein the amine curing agent comprises a polyamido amine.

9. The method according to claim 1 wherein the polymer toughening agent comprises a core shell polymer.

10. The method according to claim 1 wherein the polymeric toughening agent comprises a liquid polymer comprising repeating units derived from butadiene.

11. The method according to claim 1 wherein the curable epoxy adhesive composition further comprises at least one phosphorous-containing material comprising encapsulated elemental red phosphorous, melamine phosphate, dimelamine phosphate, pyrophosphate or an inorganic phosphinate.

* * * * *

UNITED STATES PATENT AND TRADEMARK OFFICE
CERTIFICATE OF CORRECTION

Page 1 of 1

PATENT NO. : 10,106,711 B2
APPLICATION NO. : 15/335813
DATED : October 23, 2018
INVENTOR(S) : Sohaib Elgimiabi It is certified that error appears in the above-identified patent and that said Letters Patent is hereby corrected as shown below:

On the Title Page

Item (62), under (Related U.S. Application Data)
Line 4, below "abandoned." insert -- Mar. 31, 2010 (GB) 1005444 --, as a new entry.

In the Claims

Column 17
Line 20, in Claim 11, before "pyrophosphate" insert -- melamine --.

Signed and Sealed this
First Day of January, 2019

Andrei Iancu
*Director of the United States Patent and Trademark Office*